April 7, 1959 F. W. ROHE 2,880,830
SANDWICH PANEL AND FLANGED INSERT NUT ASSEMBLY
Filed Feb. 21, 1957
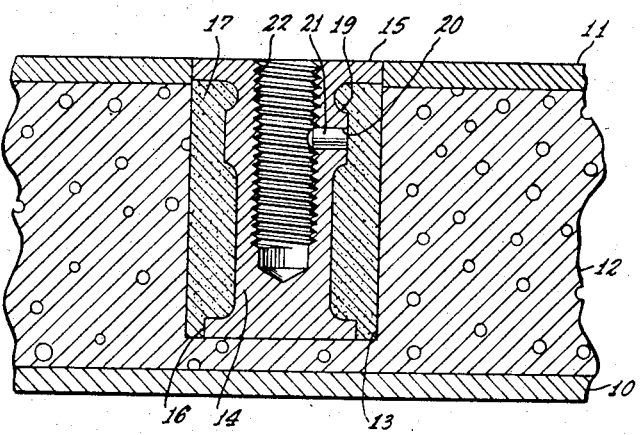
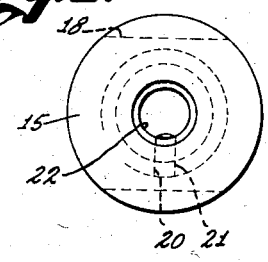
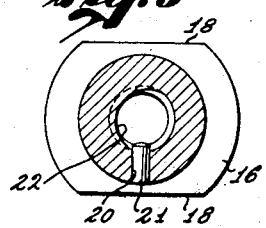
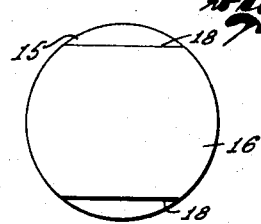
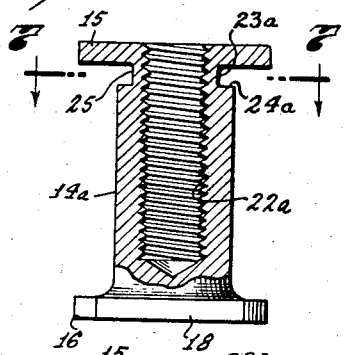
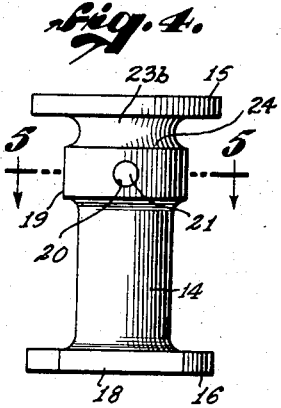
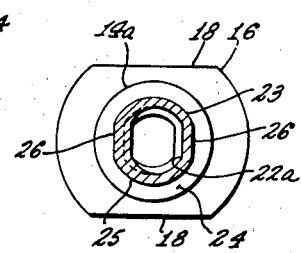
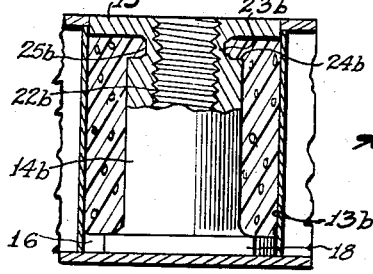
FREDERICK W. ROHE
INVENTOR
BY Lynn W. Latta
ATTORNEY.

United States Patent Office 2,880,830
Patented Apr. 7, 1959

2,880,830
SANDWICH PANEL AND FLANGED INSERT NUT ASSEMBLY

Frederick W. Rohe, Anaheim, Calif.

Application February 21, 1957, Serial No. 641,620

6 Claims. (Cl. 189—34)

This application is in part a continuation of my pending application Serial No. 346,950, filed April 6, 1953, for Flanged Insert Nut for Panels and now abandoned, and is in part a continuation of my pending application Serial No. 373,133, filed August 10, 1953, for Internally Threaded Insert Anchor Element.

This invention relates to internally threaded anchor elements, i.e., anchor nuts for insertion in panels to which other parts are to be secured by means of screws, which have come to be referred to commonly in the trade as "moldable inserts" and has as a general object to provide a sandwich panel and nut assembly embodying a relatively simple, inexpensive moldable insert anchor nut having internal thread-locking means. Another object is to provide such an assembly embodying an anchor nut having means interlocking with a body of molded material surrounding the anchor nut and disposed in a cavity or hole in the mounting panel, whereby the anchor nut is mounted in a manner to resist rotation when a screw element is threaded thereinto.

The invention deals particularly with the problem of anchoring nuts to panels which are of a soft or fragile character such that a direct threaded connection of a screw thereto will not hold satisfactorily, but will tend to pull lose. A particular object of the invention is to provide an anchor nut especially adapted for the provision of an anchoring connection between such a panel and a screw employed for attaching a member to the panel.

Another object of the invention is to provide an anchor nut which is anchored in a panel through the medium of a molded body filling a hole in the panel and embedding the anchor nut therein.

Another object is to provide an anchor nut having means to completely close the outer end of the panel and to cover the molded anchoring body therein.

A further object is to provide such an anchor nut having means cooperable with the wall of the hole to center the inner end of the nut in coaxial relation to the hole, said means also cooperating with the molded anchoring body to hold the nut against rotation in the hole. Thus it is possible to utilize a cylindrical bore as the hole which receives the nut.

Another object of the invention is to provide such a nut with improved means functioning triply to: (1) lock a screw to the nut to restrain undesired unthreading in the presence of vibration; (2) reinforce the wall of a reduced stem portion of the nut between the ends thereof; and (3) assist in retaining the nut against pulling out of the molded anchoring body in which it is embedded.

A still further object is to provide a mounting structure including an improved, simplified anchor nut, a panel in which the nut is anchored in flush relation to a face of the panel, and a molded body surrounding and anchoring the nut in the panel.

More specifically, to the end that the structure of the anchor nut may be of maximum simplicity, the invention contemplates the combination of the thread locking function and the locking of the anchor nut in the molded mounting body, in a single structural feature of the anchor nut, i.e. the utilization of a common structural part to obtain both functions.

Other objects and advantages will become apparent in the ensuing specifications and appended drawing in which:

Fig. 1 is a sectional view of an assembly embodying the invention, comprising a panel, a molded anchoring body and one of my improved anchor nuts in one form thereof;

Fig. 2 is an outer end view of the nut of Fig. 1;

Fig. 3 is an inner end view of the same;

Fig. 4 is a side view of the same;

Fig. 5 is a transverse sectional view of the same, taken on the lines 5—5 of Fig. 4;

Fig. 6 is an axial sectional view of an anchor nut embodying a modified form of the invention;

Fig. 7 is a transverse sectional view of the nut of Fig. 6, taken on the line 7—7 of Fig. 7; and Fig. 8 is a sectional view of an assembly embodying a modified form of the invention, illustrating the nut of Figs. 6 and 7 in partial section.

Referring now to the drawing in detail, I have shown in Fig. 1, as an example of one form in which the invention may be embodied, an assembly comprising a panel consisting in spaced parallel skin sheets 10 and 11 and a central body or core 12, the panel being provided with a hole 13; an anchor nut comprising a body 14 and heads 15 and 16; and a molded anchoring body 17 in which the nut is embedded, the anchoring body 17 filling the hole 13 and anchoring the nut therein.

The panel is of a lightweight type commonly used in finishing the interior of airplanes having maximum lightness as a primary requisite. Such panels are also used in flooring, fuselage skin structure, and wing skin structures. They are well known, and are particularly characterized by attaining lightness in weight through the low density characteristic of the cellular core 12, while attaining strength in the skin sheets 10 and 11 which are commonly of sheet metal (e.g. sheet aluminum).

Such panels have greatly improved airframe structure by reducing weight and providing added heat insulating effectiveness, but such improvement has introduced added difficulties in the problem of securely attaching such panels to the frame structure of an aircraft fuselage, and of attaching other parts to the panels. These difficulties include not only the tendency for the attached parts to pull loose from the panels, but also to damaging of the panel surface where fasteners are riveted or otherwise forcibly attached to the panel. Prior to the present invention, there was no available fastener device that was satisfactory to meet these problems.

In the practice of the invention, holes 13 are bored in the panel at the points where attaching screws are to be anchored to the panel. The holes 13 are of the proper diameter to snugly receive the insert nut of my invention, as will presently appear.

Referring now to the nut in the form shown in Figs. 1–5, the body 14, for a majority of its length, comprises a cylindrical stem which is integrally joined to bottom head 16. Head 16 is in the form of a radial flange having a diameter to snugly fit the cylindrical wall of hole 13 at the bottom thereof, and having diametrically opposite sides thereof provided with chordal flats 18 which are engaged by the anchor body 17 to grip the nut against rotation. Adjacent outer head 15, body 14 has an enlarged annular boss 19, in which is provided a radial bore 20. A locking plug 21, of a tough, moderately hard material such as hard fibre, phenolic resin or equivalent material, is press-fitted into bore 20 and is adapted to engage the thread of a screw received in threaded axial bore 22 of the body 14, so as to lock the screw and nut together sufficiently to prevent unthreading in the presence of vibration. Boss 19 is joined to outer head 15 by a reduced neck 23 which, together with head 15 and boss 19, defines an annular groove 25 into which anchoring body 17 extends.

The boss 19, in its annular end face opposite the head 15, presents an annular shoulder 24 facing the head 15, against which the anchoring body bears to restrain the nut from pulling out of the hole 13.

Outer head 15 is circular, and functions to seal the outer end of hole 13 so as to completely cover and contain therein the anchoring body 17.

Anchoring body 17 is of a plastic material. It is a molded body and in the complete assembly as shown in Fig. 1, it fills the hole 13, is molded around the anchor nut, and is solidified so as to grip the chordal flats 18 of the bottom flange 16 and to restrain the nut against rotation in the hole. These conditions can be attained by use of a plastic material that is sufficiently fluid to be inserted into the hole 13 by standard molding practice e.g. by pouring the material in a liquid form into the hole, and subsequently solidifying the molded material, using any standard procedure for curing or hardening it from its initial liquid or softened state to its final solidified state. The essential characteristic of the invention is that the molding process be such that the plastic will completely fill the hole 13 and surround the anchor nut so as to securely grip it when it becomes solidified.

Since the heads 15 and 16 are both fitted to the cylindrical wall of hole 13, the nut will be coaxially related to the hole and, assuming that the latter has been accurately bored with its axis normal to the surfaces of the panel, the nut will likewise have its threaded bore in such normal relation.

It will be apparent that the plastic material may be inserted into the hole 13 prior to insertion of the anchor nut, in a predetermined quantity sufficient to fill the space around the nut when the latter is in place, and the nut may then be inserted under pressure sufficient to cause the plastic material to extrude upwardly in the spaces between flats 18 and the wall of the hole, until the nut bottoms against the bottom of the hole and closes the top of the hole with head 15.

Figs. 6 and 7 illustrate a modified form of the anchor nut in which, instead of annular boss 19, the body 14a is joined to head 15 by a reduced neck 23a, with an annular shoulder 24a being defined at the junction between neck 23 and body 14a, and an annular groove 25a being defined between shoulder 24a and head 15. As in the other form of the invention, the plastic body 17 will fill this annular groove 25a and interlock with shoulder 24a to resist the nut being pulled out of the hole 13.

Instead of the locking plug 21 of Figs. 1–4, the neck 23a of the nut of Figs. 6 and 7 is provided with flattened sides 26, and the threads 22a, within neck 23a, are correspondingly deformed so as to lock the screw that is threaded into the nut. The thread deformation is confined, axially, to the area of neck 23a.

As shown in Fig. 8, the bottom of hole 13b may consist in the inner face of the skin sheet 10, which remains unbored. Also, Fig. 8 illustrates more in detail the nature of the cellular core 12, which may, as indicated, be fabricated of sheet or ribbon material, with edges thereof joined to the skin sheets 10 and 11.

As a further modification of the invention, the form of the invention as shown in Fig. 8 may be provided with a thread-lock involving a reduction in thread diameter in which the neck 23b is deformed radially inwardly at the bottom of groove 25b, uniformly throughout the full circumference of the neck, so as to provide a locking thread of circular section and of a diameter reduced below the normal diameter of the remainder of the threaded bore 22b, to provide an interference fit with the male thread of the screw that is threaded into the insert.

It will be apparent that in each form of the invention, the insert comprises a generally cylindrical body section including a stem portion 14 or 14a or 14b as the case may be, and a reduced neck 23 or 23a or 23b as the case may be, joining the stem portion to the outer head 15; a boss section 19 of intermediate diameter being interposed between the stem 14 and neck 23 in the form of the invention as shown in Fig. 4.

I claim:

1. In combination: a panel of sandwich structure including skin sheets and a low density core sandwiched between them, said panel having a cylindrical hole beginning with a circular opening in one of said skin sheets, extending a substantial distance into said core, and terminating in a closed bottom; an insert nut comprising a generally cylindrical elongated body having an internally threaded bore and integral top and bottom heads at respective ends thereof in the form of radial flanges, said bottom head being of elongated form and having arcuate ends fitted to the wall of said hole at the bottom thereof and having flat sides disposed chordally within the extended circumference of said arcuate ends and spaced from the wall of said hole to define locking recesses, and said top head having a circular rim fitted to the edge of the skin sheet defining said hole and thereby provided with solid lateral support, said top head filling said opening to provide a flush closure for said hole, said body including a neck of reduced diameter adjacent said top head and a stem portion of diameter intermediate said neck portion and said heads, said stem portion defining an annular shoulder facing said top head at its end adjoining said neck portion; and an anchoring body of solidified plastic material filling the hole around said nut body, confined between said top head and the bottom head for restraining said nut from pulling out of the hole, and engaged in said locking recesses between said flat sides of the bottom head and the wall of the hole to restrain rotation of the nut within the hole.

2. In combination: an initially rigid panel of sandwich structure including skin sheets and a low density core sandwiched between them and enjoining them together, said panel having a hole beginning with a circular opening in one of said skin sheets, extending through said core to the other skin sheet and terminating in a closed bottom defined by said other skin sheet; an insert nut comprising a generally cylindrical stem having an internally threaded bore, top and bottom heads and in the form of flanges projecting radially beyond the diameter of said stem, and a reduced neck joining the top head integrally to one end of said stem, said bottom head being integrally joined to the other end of said stem and being of elongated form having arcuate ends fitted to the wall of said hole near said bottom and having cutaway sides disposed generally chordally within the extended circumference of said arcuate ends and spaced from the wall of said hole to define locking recesses, said reduced neck being deformed radially inwardly to provide an inwardly projecting thread portion, of smaller radius than the remaining portion of the thread of said bore, for locking engagement with a screw threaded into said bore, said top head filling said top opening to provide a flush closure for said hole; and an anchoring body of solidified plastic material filling said hole around said nut body, confined between said top head and the bottom of the hole, engaged against said annular shoulder and the upper face of said bottom head for restraining said nut from pulling out of the hole, and engaged in said locking recesses between said flat sides of the bottom head and the wall of said hole, to restrain rotation of the nut within the hole.

3. In combination: a panel of sandwich structure including skin sheets and a low density core sandwiched between them, said panel having therein a cylindrical hole beginning with a circular opening in one of said skin sheets, extending a substantial distance into said core, and terminating in a closed bottom; an insert nut comprising a generally cylindrical elongated body having an internally threaded bore and including top and bottom heads in the form of radially projecting flanges, said bottom head being of elongated form having quarter-circular ends fitted to the wall of said bore near said bottom and having flat sides disposed within the extended circumference of said ends and in chordal relation thereto, and said top head being circular, snugly fitted within said opening to provide a flush closure for the hole, and supported by the edge of the skin sheet around said opening, said nut body including a stem portion, a reduced neck portion, and an enlarged annular boss between said stem portion and said reduced neck portion, said annular boss being axially spaced from both of said heads and presenting an annular shoulder facing said top head, and said boss having a radial bore and a plug of tough plastic material in said radial bore and engageable with the threads of a screw mounted in said threaded bore; and an anchoring body of solidified plastic material filling said hole and surrounding said body in intimate contact therewith, engaged against said annular shoulder and the upper face of said bottom head for restraining said nut from pulling out of the hole, and engaged in said locking recesses between said flat sides of the bottom head and the wall of said hole, to restrain rotation of the nut within the hole.

4. The combination defined in claim 2, wherein said reduced neck portion is flattened at diametrically opposite sides thereof to provide said locking thread portion.

5. The combination defined in claim 2, wherein said reduced neck is deformed inwardly to provide a locking thread of diameter reduced throughout a full circumference below the diameter of the remainder of said internally threaded bore.

6. In combination: an initially rigid panel of sandwich structure including skin sheets and a low density core sandwiched between and joining said sheets, said panel having a preformed cylindrical hole beginning with a circular opening in one of said skin sheets, extending through said core and terminating in a closed bottom in adjacent spaced parallel relation to the inner face of the other skin sheet; an insert nut comprising a generally cylindrical elongated body having an internally threaded bore and integral heads at both ends thereof in the form of radial flanges, said heads being both of substantially the same diameter as the internal cylindrical wall of said hole, said bottom head bearing against the bottom of said hole and having cutaway sides disposed generally chordally within and spaced from the peripheral wall of said hole to define locking recesses, said top head having a circular rim fitted to the edge of the skin sheet defining said circular opening and thereby provided with solid lateral support, said top head filling said opening to provide a flush closure for said hole, said nut having means for locking engagement with a screw threaded into said bore; and an anchoring body of solidified plastic material filling said hole around and in intimate contact with said nut body, engaged against the upper face of said bottom head to resist pulling of the nut out of said hole, and engaged in said locking recesses between said flat sides of the bottom head and the wall of the hole, to restrain rotation of the nut within the hole.

References Cited in the file of this patent

UNITED STATES PATENTS

| 692,841 | Fenton | Feb. 11, 1902 |
| 2,286,982 | Todd | June 16, 1942 |
| 2,462,603 | Boots | Feb. 22, 1949 |
| 2,585,557 | Kreimendahl | Feb. 12, 1952 |
| 2,607,447 | Tuttle | Aug. 19, 1952 |

FOREIGN PATENTS

| 897,649 | France | May 30, 1944 |
| 137,394 | Australia | May 25, 1950 |
| 647,302 | Great Britain | 1950 |
| 657,359 | Great Britain | 1951 |